April 18, 1961 K. LEHOVEC ET AL 2,980,831

MEANS FOR REDUCING SURFACE RECOMBINATION

Filed Nov. 21, 1957

INVENTORS
KURT LEHOVEC
RAINER ZULEEG

BY Connolly and Hutz
ATTORNEYS

United States Patent Office 2,980,831

Patented Apr. 18, 1961

2,980,831

MEANS FOR REDUCING SURFACE RECOMBINATION

Kurt Lehovec, Williamstown, and Rainer Zuleeg, North Adams, Mass., assignors to Sprague Electric Company, North Adams, Mass., a corporation of Massachusetts Filed Nov. 21, 1957, Ser. No. 697,962

4 Claims. (Cl. 317—235)

This invention relates to transistors, phototransistors and similar devices having a semiconducting body which may carry a minority carrier current and in particular to the problem of surface recombination of the minority carriers in the semiconducting body.

Minority carriers in a semiconducting body are elements for current transfer of an opposite sign to the majority carriers of the semiconducting body in which the minority carriers are present. Holes injected in N-type conductance material are minority carriers whereas electrons injected in a P-type conductance material are minority carriers. The minority carriers move through the conductance material to a collector electrode. This current is the stream within a semiconducting body which is employed to effect control in transistors, phototransistors and similar control devices. The current yield in a semiconducting body is an important characteristic. Surface recombination causes a loss of minority carriers by recombination with the majority carriers, such recombination taking place at the surface of the semiconducting body.

It is an object of this invention to provide a semiconducting body with a minimum surface having surface recombination of minority carriers.

It is another object of this invention to provide a means and method for reducing surface recombination in semiconductance materials.

A still further object of this invention is the treatment of the surface of a semiconducting body to protect it against alteration and aging.

These and other objects of this invention will become more apparent upon consideration of the following descriptions taken together with the accompanying drawings.

The unit of this invention comprises a semiconducting body and electrodes together with other components for maintaining control in a semiconducting body. According to this invention the semiconducting body is covered on its outer surface with a substance which has a high efficiency in the injection of minority carriers into the semiconducting body. This surfacing substance, however, is electrically insulated (so-called floating relation) with respect to the electrodes. The substance with high minority carrier injection which is coated on the semiconducting body will receive from the semiconducting body a minority carrier, for example, a hole. When this hole reaches the contact of the coating substance on the semiconducting body the contact will be charged positively. In a stationary state an equal negative charge will necessarily flow to the contact and by the same operation a positive charge will necessarily leave the contact to return to the semiconducting body. The contact of the surfacing substance of this invention provides a high order of efficiency of the injection of this balancing charge which leaves the contact. This efficiently is related to the reception of the minority carrier, hole, at the contact. The loss of holes at a surface covered by the surfacing substance of this invention is determined by the injection efficiency of the contact between the surfacing substance and the semiconducting body. For examples, assuming the contact has a 100% efficiency of minority carrier injection, no loss of holes would occur as a result of holes reaching the covered surface. On the other hand, with a 50% hole injection efficiency of the contact the charge of the holes reaching the contact would result in an injection of only half that number of holes into a semiconducting body and consequently a loss of 50% of these minority carriers would result. The remaining 50% of the charge of the holes which have reached the contact would be compensated by electrons flowing toward the contact from the bulk.

Contacts of almost 100% hole injection are well-known, being used as emitters in p-n-p transistors.

More specifically, an N-type semiconducting body may have applied to it, a layer of P-type material which provides a rectifying contact. This surfacing substance may be an indium coating on the exposed surfaces of an N-type germanium semiconducting body. When this rectifying element is applied to the exposed surfaces of the semiconducting body so as to be electrically insulated (floating) from the electrodes which are in contact with the germanium, the indium coating forms a contact with the germanium which injects minority carriers into the germanium.

Figure 1:
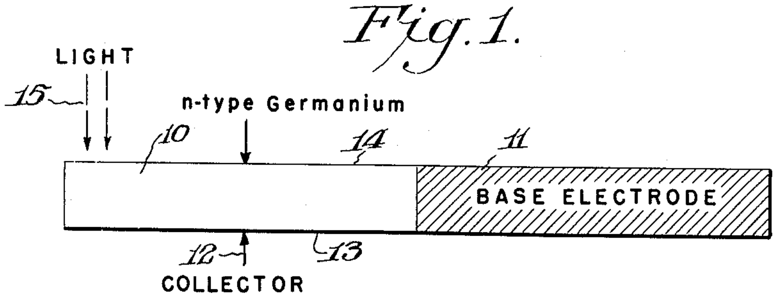
Fig. 1 shows in section a form of transistor structure containing a semiconducting body.

Referring more specifically to the drawings, Figure 1 shows a semiconducting body 10 of a suitable N-type material, for example, germanium. The body 10 is mounted on a base electrode 11 and has collector 12 contacted against a surface 13. Rays of light 15 impinge on a diametric surface 14. The rays of light 15 produce holes which are minority carriers in the body 10. These holes in the body 10 create a minority carrier current in the N-type germanium. In flowing through the semiconductor body 10 the holes of the minority carrier current are free to reach the surfaces of body 10 and combine with electrons at the surface and thus, become lost from the current. The minority carrier current is accordingly diminished.

Figure 2:
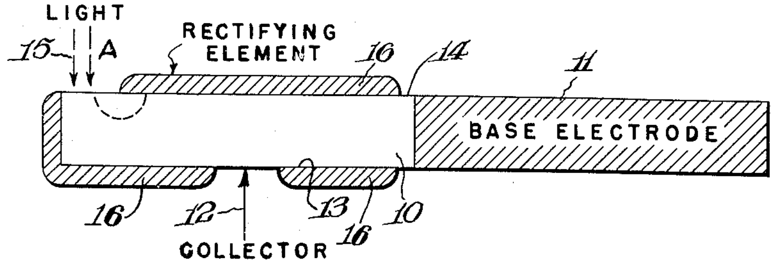
Fig. 2 shows in section an embodiment of the invention.

A structure according to this invention is diagrammatically shown in Figure 2. In this embodiment of this invention the semiconducting body 10 of Figure 1 is combined with the collector 12 and the light rays 15 and is mounted on a base electrode 11 in the same structural combination as shown in Figure 1. Collector 12 is in rectifying contact with body 10, and base 11 is in ohmic contact with the body. Collector 12 and base 11 provide the circuit contacts for the device, with collector 12 biased negative with respect to base 11, in the usual circuit arrangement for a photodiode or phototransistor. In addition, the body 10 has deposited on its exposed surfaces 13 a coating 16 of a substance which forms with the body 10 a rectifying contact. Coating 16 is in rectifying contact with body 10, but is electrically insulated from collector 12 and base 11. Coating 16 covers all of the surfaces 13 of body 10 except for regions sufficient to ensure electrical insulation from electrodes 11 and 12, and a region sufficient to permit light rays 15 to impinge on body 10. According to this invention a coating 16 of indium on a body 10 of N-type germanium forms a rectifying contact which is capable of nearly 100% minority carrier injection efficiency for the injection of holes into the semiconducting body 10. Holes injected into the body 10 by the light rays 15 and which become diverted to the surface of the body 10 are received at the coating 16, as diagrammatically illustrated by the dotted line and arrow shown in Figure 2 extending from the point A of impingement of light rays 15 onto the surface 14 to the rectifying element 16. Holes are re-emitted from the coating 16 over its entire surface, including points close to the collector 12. The path of the holes through the body 10 from the point A to the coating 16 is generally shorter than the distance from the point A to the collector 12.

Figure 3:
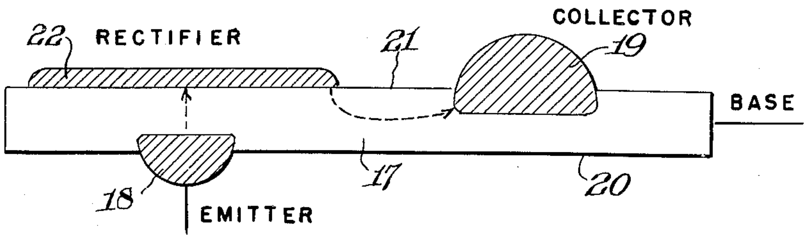
Fig. 3 shows in section a modification of the invention.

Figure 3 shows a similar effect in the use of rectifying element on the surface of a transistor where the collector and emitter electrodes are not in alignment. A semiconducting body 17 has an emitter electrode 18 and a collector electrode 19 on opposed surfaces 20 and 21, respectively. The emitter 18 and the collector 19 are not aligned diametrically on the opposed surfaces 20 and 21. The current created in the semiconducting body 17 by the injection of minority carriers from the emitter 18 would lead to a partial loss of these minority carriers by surface recombination before the minority carriers could travel to the collector electrode. By coating the surfaces 20 and 21 of the semiconducting body 17 with a substance 22 providing a rectifying contact having a high minority injecting efficiency and which is insulated from the electrodes, the loss of the minority carriers is reduced.

A means for covering the surfaces of the conducting body with the surfacing substance which provides the rectifying contact includes plating on certain metals. For example, the free surfaces of N-type germanium body, such as illustrated in Figure 2, may be coated with indium coating. The coating 16 on the body 10 is separated from the collector 12 to insure insulation of the indium coat from this electrode. The indium coating is suitably plated on the surfaces of the N-type germanium body 10 and the coating is removed in the area of the collector 12 by suitable means, such as a localized stream of etch, or by protecting the collector 12 area with a removable coating during the indium coating step. The surface coating may also be provided by the evaporation of a transparent metal on the body 10. The layer of high injection efficiency need not be a foreign material. It is possible to convert a surface zone of the N-type germanium to P-type, e.g., by in-diffusion of P-type impurities; the p-n junction thus resulting can be made to have a high efficiency of hole injection. Other means and methods for applying the coating of rectifying elements to the semiconducting body will be apparent to those skilled in the preparation of transistors. Some advantages of the construction of this invention have been indicated above. When holes are released in a semiconducting body at a distance from the collector, there is an appreciable chance for recombination before reaching the collector. By this invention this recombination is eliminated as a cause for diminishing current yield. Another advantage of this invention is the elimination of alteration of the semiconducting body surface by the recombination of the minority carriers at the surface.

It will be understood that the embodiments shown and illustrated in the drawings have been set forth for the purpose of description only. Accordingly, it is intended that this invention be limited only by the scope of the appended claims.

What is claimed is:

1. A semiconductor device comprising a body of semiconductive material, a first electrode in ohmic contact with said body, a second electrode in rectifying contact with said body, a surface coating in rectifying contact with said body and in electrical floating isolation from said first and second electrodes, said coating having a high minority carrier injection efficiency with respect to said semiconductive material, an open area in said coating providing means to permit the injection of minority carriers into said body, said open area spaced from said second electrode.

2. The semiconductor device of claim 1 wherein said semiconductive material is N-type germanium and said coating is indium.

3. The semiconductor device of claim 1 wherein said means are light rays projected onto said open space.

4. The semiconductor device of claim 1 wherein said means is a third electrode in rectifying contact with said body within said open space.

References Cited in the file of this patent

UNITED STATES PATENTS

| | | |
|---|---|---|
| 2,646,609 | Heins | July 28, 1953 |
| 2,699,594 | Bowne | Jan. 1, 1955 |
| 2,778,885 | Shockley | Jan. 22, 1957 |
| 2,794,863 | Roosbroeck | June 4, 1957 |
| 2,798,189 | Alexander | July 2, 1957 |
| 2,842,668 | Rutz | July 8, 1958 |
| 2,842,723 | Koch et al. | July 8, 1958 |